US008825883B2

(12) United States Patent  
Anipko et al.

(10) Patent No.: US 8,825,883 B2
(45) Date of Patent: Sep. 2, 2014

(54) CONNECTIVITY PLATFORM

(75) Inventors: Dmitry A. Anipko, Bellevue, WA (US);
Deepak Bansal, Redmond, WA (US);
Aaron J. Schrader, Redmond, WA (US);
Benjamin M. Schultz, Kirkland, WA (US); Rajesh Sundaram, Redmond, WA (US); David G. Thaler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 12/040,330

(22) Filed: Feb. 29, 2008

(65) Prior Publication Data

US 2009/0222568 A1  Sep. 3, 2009

(51) Int. Cl.
*G06F 15/16* (2006.01)

(52) U.S. Cl.
USPC .......................................................... 709/229

(58) Field of Classification Search
CPC .... G06Q 30/02; H04L 67/2871; H04L 67/28;
H04L 67/2814; H04L 41/5019; H04L 47/24;
H04L 65/80; H04L 69/32; H04L 69/22;
H04L 69/161; H04L 69/16; H04L 47/39;
H04L 47/30; H04L 47/10; H04L 29/12028;
H04L 61/103; H04L 63/0272; H04L 61/2015;
H04L 63/123; H04L 63/0485; H04L 63/20;
H04L 63/0218; G06F 9/5077; G06F 9/54
USPC .......................................................... 709/229
See application file for complete search history.

(56) References Cited

U.S. PATENT DOCUMENTS

| | | | |
|---|---|---|---|
| 5,142,622 A | 8/1992 | Owens | |
| 5,931,900 A | 8/1999 | Notani et al. | |
| 6,101,543 A * | 8/2000 | Alden et al. | 709/229 |
| 6,493,765 B1 | 12/2002 | Cunningham et al. | |
| 6,496,511 B1 | 12/2002 | Wang et al. | |
| 6,771,635 B1 | 8/2004 | Vilander et al. | |
| 6,856,624 B2 | 2/2005 | Magret | |

(Continued)

FOREIGN PATENT DOCUMENTS

| | | |
|---|---|---|
| EP | 1659729 A1 | 5/2006 |
| WO | 2006087429 A1 | 8/2006 |

OTHER PUBLICATIONS

Winsock 2, Windows socket: story part 2, Tenouk.com, May 13, 2007, retrieved from the internet <web.archive.org/web/*/www.tenouk.com/Winsock/Winsock2story2.html>, pp. 1-9 as printed.*

(Continued)

*Primary Examiner* — Kambiz Zand
*Assistant Examiner* — Shu Chun Gao
(74) *Attorney, Agent, or Firm* — John Jardine; Andrew Sanders; Micky Minhas

(57) ABSTRACT

Disclosed are a connectivity platform that allows for proprietary connectivity modules to plug into the operating system and also allows the operating system users and various existing networking applications in the operating system that are authorized by those providers to use that connectivity via existing APIs without the need for the applications to change or for extra configuration of the application to be performed. In an example disclosed herein, the providers provide NAT or firewall traversal and implement the appropriate transport mechanism. This allows for applications and computing devices to communicate in environments where connectivity is prevented by intermediate systems.

20 Claims, 7 Drawing Sheets

(56) References Cited

U.S. PATENT DOCUMENTS

| | | | |
|---|---|---|---|
| 6,934,763 | B2 | 8/2005 | Kubota et al. |
| 7,079,520 | B2 | 7/2006 | Feige et al. |
| 7,519,865 | B1 | 4/2009 | Maly et al. |
| 2003/0140283 | A1 | 7/2003 | Nishio |
| 2003/0158962 | A1 | 8/2003 | Keane et al. |
| 2004/0064584 | A1 | 4/2004 | Mitchell et al. |
| 2004/0139228 | A1 | 7/2004 | Takeda et al. |
| 2005/0105543 | A1 | 5/2005 | Ikenaga et al. |
| 2005/0165953 | A1* | 7/2005 | Oba et al. ............. 709/238 |
| 2005/0185647 | A1* | 8/2005 | Rao et al. ............. 370/392 |
| 2005/0271047 | A1 | 12/2005 | Huonder et al. |
| 2006/0182100 | A1 | 8/2006 | Li et al. |
| 2006/0209716 | A1 | 9/2006 | Previdi et al. |
| 2006/0215684 | A1 | 9/2006 | Capone |
| 2006/0235997 | A1 | 10/2006 | Munirajan et al. |
| 2006/0262786 | A1 | 11/2006 | Shimizu et al. |
| 2007/0058568 | A1 | 3/2007 | Previdi et al. |
| 2007/0091907 | A1 | 4/2007 | Seshadri et al. |
| 2007/0204154 | A1* | 8/2007 | Swander et al. ............. 713/166 |
| 2007/0239860 | A1 | 10/2007 | Shirai |
| 2008/0080508 | A1* | 4/2008 | Das et al. ............. 370/392 |
| 2009/0222559 | A1 | 9/2009 | Anipko et al. |

OTHER PUBLICATIONS

RFC 3927, Cheshire et al., Dynamic Configuration of IPv4 Link-Local Addresses, Network Working Group, retrieved from the internet <tools.ietf.org/pdf/rfc3927>, pp. 1-34 as printed.*

Atsushi Kara, University of Aizu, "Secure Remote Access from Office to Home", IEEE Communications Magazine, Oct. 2001, pp. 68-72.

Cao et al., "A Gatekeeper-based NAT Traversal Method for Media Transport in H.323 Network System", 2005, pp. 1288-1291.

Huang et al., Department of Computer Science and Information Engineering National Chiao Tung University, "Tunneling IPv6 through NAT with Teredo Mechanism", 2005, 6 Pages.

Huang et al., Department of Electrical Engineering, National Cheng Kung University, Ta-Hsueh Road,Tainan, Taiwan, "Smart Tunnel Union for NAT Traversal", 2008, http://csdl2.computer.org/persagen/DLAbsToc.jsp?resourcePath=/dl/proceedings/&toc=comp/proceedings/nca/2005/2326/00/2326toc.xml&DOI=10.1109/NCA.2005.50.

Zhou Hu, Telecommunications Software and Multimedia Laboratory Helsinki University of Technology, "NAT Traversal Techniques and Peer-to-Peer Applications", Apr. 26/27, 2005, 5 Pages.

"NAT Traversal for VoIP and Internet Communications using STUN, TURN and ICE", Eyeball Networks Inc., 2007, 16 Pages.

Reply to Non-Final Office Action cited in U.S. Appl. No. 12/050,027 dated Aug. 21, 2012,13pgs.

Notice of Allowance cited in U.S. Appl. No. 12/050,027 dated Aug. 31, 2012, 23 pgs.

Reply to Non-Final Office Action cited in U.S. Appl. No. 12/050,027 dated Oct. 6, 2010, 14 pgs.

Final Office Action cited in U.S. Appl. No. 12/050,027 dated Dec. 28, 2010, 10 pgs.

Reply to Final Office Action cited in U.S. Appl. No. 12/050,027 dated Mar. 27, 2011, 14 pgs.

Non-Compliant Office Action cited in U.S. Appl. No. 12/050,027 dated Apr. 19, 2012, 3 pgs.

Reply to Non-Compliant Office Action cited in U.S. Appl. No. 12/050,027 dated Apr. 26, 2012, 10 pgs.

Non-Final Office Action cited in U.S. Appl. No. 12/050,027 dated May 21, 2012, 11 pgs.

Non-final Office Action cited in related U.S. Appl. No. 12/050,027 dated Jul. 6, 2010.

"RFC1142—OSI IS-IS Intra-domain Routing Protocol", David Oran, Feb. 1990, 152 pp., retrieved from the Internet at: www.faqs.org/rfcs/rfc1142.html.

"Efficient micro-mobility using intra-domain multicast-based mechanisms (M&M)", Ahmed Helmy, Muhammad Jaseemuddin and Ganesha Bhaskara, ACM SIGCOMM Computer Communication Review, vol. 32, Issue 5, Nov. 2002, pp. 61-72.

"Scalable inter-domain routing architecture", Deborah Estrin, Yakov Rekhter and Steven Hotz, ACM SIGCOMM Computer Communication Review, vol. 22, Issue 4, Oct. 1992, pp. 40-52.

"Scaling Inter-Domain Routing—a View Forward", Geoff Huston, Dec. 2001, pp. 15, retrieved from the Internet at: www.potaroo.net/papers/ipj/2001-v4-n4-scaling-bgp/scaling.pdf.

"Routing to External Domains", Jan. 24, 2008, 5 pp., retrieved from the Internet at: http://technet.microsoft.com/en-us/library/bb232045.aspx.

Amendment after Notice of Allowance cited in U.S. Appl. No. 12/050,027 dated Nov. 30, 2012, 9 pgs.

Non-Final Office Action cited in U.S. Appl. No. 13/729,812 dated Oct. 10, 2013, 16 pgs.

Reply Non-Final Office Action cited in U.S. Appl. No. 13/729,812 dated Jan. 10, 2014, 13 pgs.

Final Office Action cited in U.S. Appl. No. 13/729,812 dated Mar. 28, 2014, 11 pgs.

* cited by examiner

CONNECTIVITY PLATFORM

TECHNICAL FIELD

This description relates generally to network connectivity and more specifically to the traversal of firewalls and Network Address Translators.

BACKGROUND

Communications devices have multiple obstacles to the seamless exchange of data. Whether these devices are on Intranets or on the public Internet, various security and addressing devices could disrupt their communication. One device that can disrupt communication is a firewall. While the benefits of a firewall provide a higher security level, arbitrary ports are blocked which increase the possibility of communications interference. Another device that can disrupt the exchange of data is a Network Address Translator (NAT). NATs have the benefit of allowing multiple devices on a private network to share the same global IP address, by handing out private addresses behind these devices and masking these private addresses with that shared global address. In this process several assumptions are made that could disrupt data exchange. This can include overlap in private addressing. When applications that run on communications devices that make addressing assumptions, the data exchange may not occur as expected, resulting in a poor usability experience.

In addition to the above described communication disruptions, there are only a few address blocks that are designated as private. Deployment of NATs leads many home and corporate environments to use the same addresses in their private networks. In some cases, two machines in different environments may have the same IP address. Thus without some out of band mechanism it is impossible for the application to identify to which destination computing device the application is attempting to send the traffic. There are many solutions currently available to traverse NATs and firewalls. These solutions typically require that applications include a customized implementation that allows for end-to-end communication. Examples of custom NAT traversal approaches include Simple Traversal of UDP through NATs (STUN) and Traversal using Relay NAT (TURN).

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a connectivity platform that allows for proprietary connectivity modules (providers) to integrate into the operating system and also allows the operating system users and various existing networking applications in the operating system that are authorized by those providers to use that connectivity via existing APIs without the need for the applications to change or for extra configuration of the application to be performed. In this example, the providers provide NAT or firewall traversal and implement the appropriate transport mechanism. This can allow for applications and computing devices to communicate in environments where connectivity is prevented by intermediate systems.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
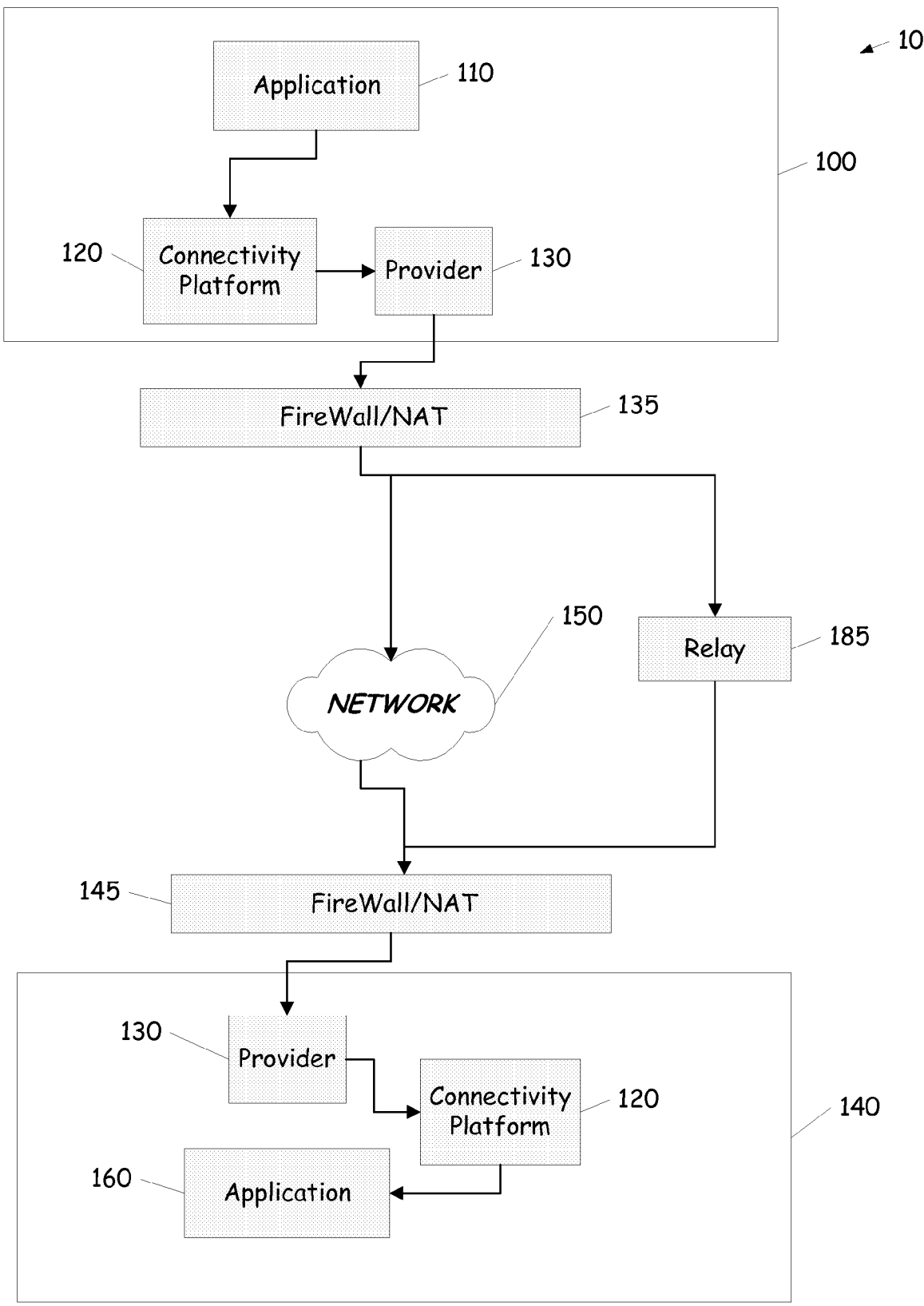
FIG. 1 is a block diagram of an illustrative connectivity system.

FIG. 1 is a block diagram of a connectivity system 10 according to one illustrative embodiment. System 10 includes computing device 100 and computing device 140. Computing device 100 includes an application 110, a connectivity platform 120 and a provider 130. Provider 130 communicates to another provider located on computing device 140 through a network, such as network 150. While the arrows in FIG. 1 indicate communication from computing device 100 to computing device 140, it should be noted that communication may flow in the opposite direction. In one embodiment, computing device 140 includes similar components as computing device 100. FIG. 1 illustrates an embodiment where a single application or user uses a provider 130 to connect to computing device 140. In this embodiment computing device 100 and computing device 140 have the same provider 130. However, in other embodiments each computing device 100, 140 may have a different provider. Prior to reaching the network 150 the provider processes a request through a firewall or Network Address Translator (NAT) 135. In one embodiment, from the NAT 135 a signal is transmitted through network 150 to a firewall or NAT 145 which protects computing device 140 and then onto components of computing device 140. While a firewall or NAT is illustrated at both computing device 100 and 140 in alternative embodiments one or both of the computing devices may lack a firewall or NAT.

Application 110 is any application running on, or service of, computing device 100 that requires a connection or communication with a computing device, such as to computing device 140 across a network. For example application 110 may be an internet browser, an instant messaging system, or any other application using a network. The Application generates data that is to be communicated to the other computing device 140. The application 110 may also provide an identifier to the operating system of the computing device for the desired communication. In some embodiments data from application 110 can include an identifier or address of the destination computing device 140. In some embodiments application 110 may be located on a third computing device (not illustrated) that is connected to computing device 100 through a network.

Connectivity platform 120 is a component or components that enable a provider, such as provider 130, to plug into an operating system and/or an application running on the operating system to enable end-to-end connectivity. Connectivity platform 120 provides users (applications or services) of computing devices 100 and 140 with the ability to communicate with each other, or to other computing devices (not illustrated) connected through the network 150. To achieve this connectivity platform 120 that, in one embodiment, exposes a subnet network and routes data from application 110 to the provider (130). In one embodiment, the connectivity at the link and network layer is not transitive. In embodiments where multiple applications or users share a common provider 130 the connectivity platform or the provider 130 may limit the ability of those users or applications to connect with each other. The connectivity platform 120 will be discussed in greater detail with respect to FIG. 2 below.

Provider 130 is a component or module of system 10 that is configured to plug into the connectivity platform 120 in order to enable end-to-end connectivity between computing devices and users of the computing devices. In one embodiment the provider 130 provides some form of NAT or firewall traversal, and may also provide a data relay (illustrated as relay 185) when NAT or firewall traversal fails. Other implementations of a (relay 185-provider 130) combination may include alternative transport mechanisms including for example low priority file transfers. In some embodiments provider 130 may encapsulate packets that are sent by the connectivity platform 120 into packets that are routable over the network 150. In some embodiments multiple peers (i.e. computing devices that are all using the same or compatible providers) could build an overlay mesh network over which they could route communications as an alternative to a relay or direct communication. Provider 130 may register with the connectivity provider 120 multiple times to provide services to the same or multiple users on the computing device 100. For purposes of this discussion each registration by the provider 130 will be referred to as a provider instance. Further, for purposes of simplicity only one provider instance will be discussed. However, it is possible that multiple provider instances may be used simultaneously, for example when the user has multiple identities that need connectivity and are understood by the provider 130. The provider instance is generated inside the connectivity platform 120.

In general provider 130 can be any type of provider available. One requirement of the provider 130 is that it provides end to end network connectivity. The provider 130 transfers arbitrary data from application 110 to application 160 through the connectivity platforms based on addresses that have been associated with the applications 110, 160, users and/or computing devices through designated provider instances. The provider 130 also allows for detecting whether an address is reachable through the designated provider instance. In one embodiment the addresses involved could use IPv4 or IPv6 protocols.

Network 150 is a network that may provide connectivity for computing devices 100 and 140 Network 150 may be, for example, the Internet, a local area network, a wide area network, an intranet or any other system that allows or facilitates communication between the computing devices 100 and 140.

Firewall 135 is a component that regulates the flow of traffic between computer networks or between computing devices such as computing devices 100 and 140 based on a set of rules. Firewall 135 may also include network address translation (NAT) functionality. However, in some embodiments the firewall 135 is simply a NAT. In some embodiments, computing devices 100 and 140 are located behind a firewall have addresses in the "private address range", for example as defined in RFC 1918. The NAT functionality of firewall 135 functions to address the limited number of IPv4 routable addresses that can be used. Again as mentioned above, in other embodiments Firewall or NAT devices may only be present at some locations, or not be present at all.

Figure 2:
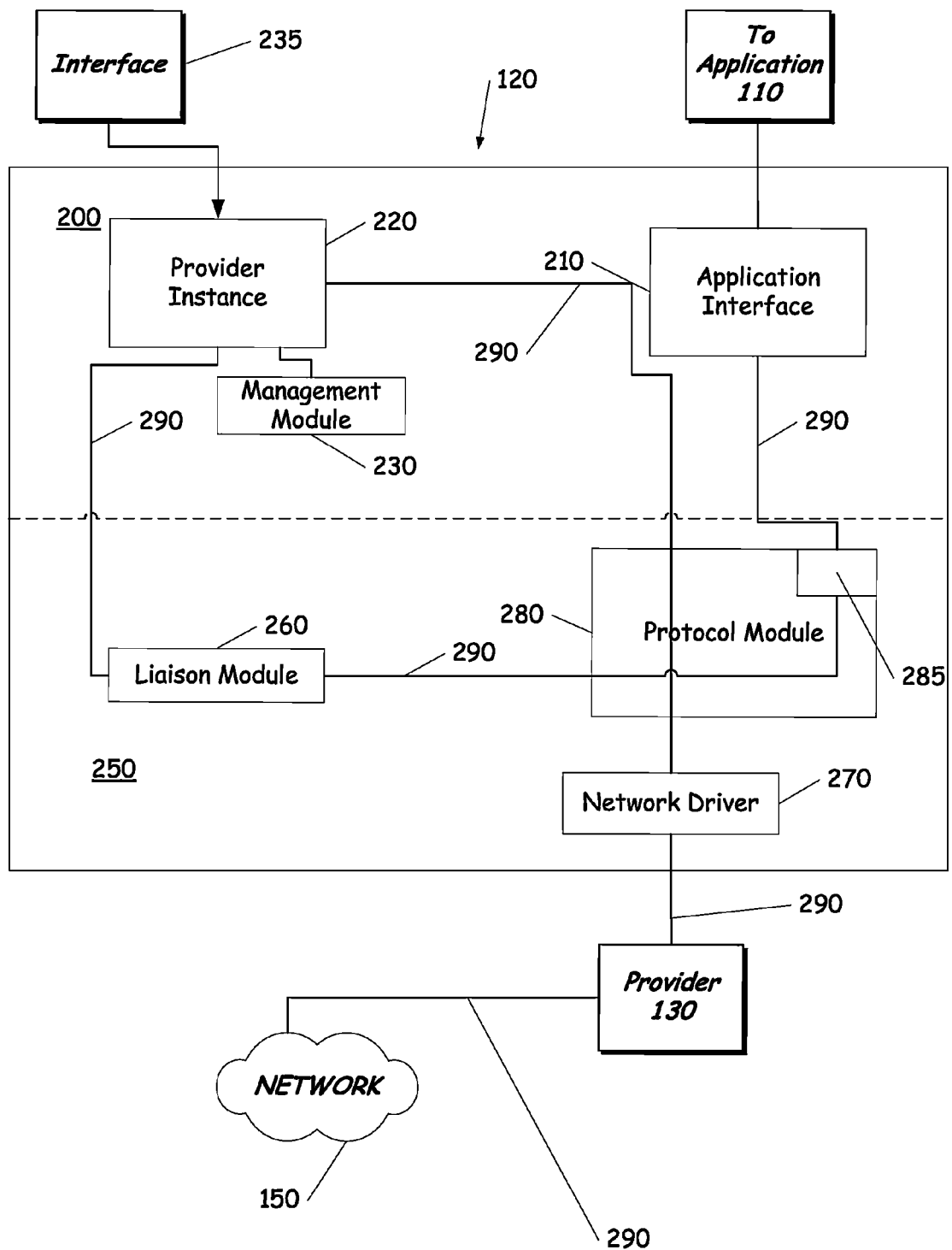
FIG. 2 is a block diagram illustrating components of a connectivity platform according to one embodiment.

FIG. 2 illustrates the components and data flow through the connectivity platform 120 according to one illustrative embodiment. While the components illustrated in FIG. 2 are shown as being in close proximity to each other, in some embodiments the components the connectivity platform 120 are located throughout the system 10.

Connectivity platform 120 is divided into a user mode 200 and a kernel mode 250. The user mode 200 of connectivity platform 110 has an application interface 210 (which interfaces with application 110 of FIG. 1), a provider instance 220 and a management module 230. The kernel mode 250 of connectivity platform 120 has an liaison module 260, a device driver 270 and a protocol module 280. While the present discussion is directed to a portion of the connectivity platform 120 being in a user mode and a portion in kernel mode, in other embodiments the connectivity platform 120 may be entirely in the user mode, or alternatively entirely in the kernel mode.

Provider instance 220 is an instance created by a provider, such as provider 130, as a result of a user action or other event. In one illustrative embodiment the provider instance 220 includes two interfaces for communicating with the provider 130. In one embodiment the interface is an LRPC interface. However, other types of interfaces may be used. The first interface is used by the provider 130 to register/deregister with the connectivity platform 120. The second interface is used by the liaison module 260 to call the provider 130 for control and data exchange.

Management module 230 is a module configured to support the transition between different addressing protocols. Additionally the management module 230 is configured to implement the registration and deregistration of providers 130 and provider instances 220, configure the IP addresses according to the correct protocols, and implement any required filters. Further, the management module 230 is configured to place the provider instances 220 into or out of a dormant state. It should be noted that the management module 230 is not part of the flow of data through the connectivity platform 120.

Liaison module 260 is a component of connectivity platform 120 that takes data to be transmitted and facilitates transmission over the provider instance 220. In one embodiment liaison module 260 is the tunnel.sys of the Windows operating system. However other types of liaison modules may be used. Network driver 270 is a software module configured to enable different network protocols communicate with a variety of network adaptors. In one embodiment the network driver 270 is compliant with network driver interface specification (NDIS). In general, network driver 270 represents a virtual or physical media (Ethernet, for example) in an interface that is understood by NDIS clients such as TCP/IP stack.

Protocol module 280 is a device that maintains a set of protocols that work together on different levels to enable communication through network 150. In one embodiment protocol module 280 implements TCP/IP protocols. Additionally, in some embodiments, protocol module 280 includes a filtering platform 285. Filtering platform 285 provides a platform for creating network filtering applications and/or inspection applications. In one embodiment the filtering platform 285 is the Windows Filtering Platform (WFP). However, other filtering methods can be used.

Interface 235 is a secondary interface through which data may flow. Interface 235 provides a platform for connecting to applications through connectivity platform 120 without using network 150. Interface 235 may be a Bluetooth connection, an IR connection, or any other connection platform that does not require the data to be received over network 150.

Briefly the flow of data through the connectivity platform 120 will be discussed. The arrows 290 illustrated in FIG. 2 indicate the direction of the flow of data through the connectivity platform 120. A more detailed description of the process will be provided with respect to FIGS. 3 and 4. In some embodiments, for inbound data, data traffic is received by the protocol module 280 and passed to the provider instance 220. In other embodiments, inbound data is received by interface 235 and passed to the provider instance 220. In some embodiments, at this point the provider instance 220 may decapsulate or packet process the data. The data traffic is then passed through liaison module 260, and is re-processed by the protocol module 280. If authorized by the filtering platform 285 according to the policy of the provider 130, provider instance 220 traffic is delivered to the application 110. In some embodiments, filtering platform 285 employs its own filtering rules as well. Outbound traffic flows in the opposite direction of arrows 290 as illustrated in FIG. 2.

Figure 3:
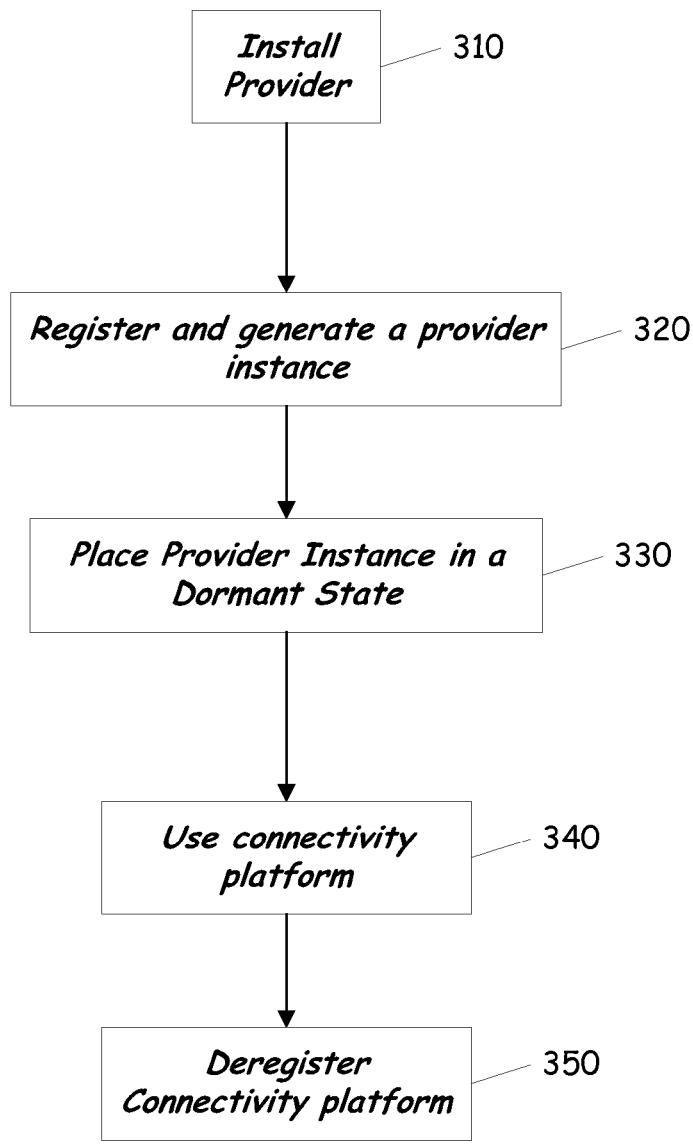
FIG. 3 is a flow diagram illustrating a process associated with the connectivity platform according to one embodiment.

FIG. 3 is a flow diagram illustrating a process for installing, registering and using a provider instance 220 according to one illustrative embodiment. For purposes of simplicity the discussion of FIG. 3 assumes that only one instance is being installed. However, a similar process may be used when multiple providers and provider instances are present.

At step 310 a provider, such as provider 130, is installed on computing device 100. Providers 130 are typically installed as a result of a user action. However, in some embodiments the provider 130 may be native to the operating system or provided as part of a larger package of software or hardware that is on the computing device. The installation of the provider 130 is executed according to the process defined by the provider.

At step 320 the provider generates the provider instance 220 which then registers with the connectivity platform 120. If this is the first time that the provider instance 220 has registered with the connectivity platform 120 the connectivity platform 120 creates a new IP interface and associates this IP interface with the provider instance 220. If the provider instance 220 has previously registered with the connectivity platform 120 then the connectivity platform 120 may reuse the IP interface that was previously associated with the provider instance 220.

During the first registration of the provider instance 220 the connectivity platform 120 may execute additional processes. For example, the connectivity platform 120 may create a user friendly name for the assigned IP interface. This user friendly name can assist a user in identifying the interface during a diagnostic procedure or other procedure where finding the interface may be useful. In some embodiments this name, or other identifier such as an IP address, may be made available to a buddy or a friend for end to end communication. The connectivity platform 120 may also configure filters on the system, such as filter 285 to implement any access controls that the provider 130 requires. The provider 130 provides this information to the connectivity platform during the registration process.

Also during the registration of the provider instance 220 the connectivity platform configures routing for data. This on-link routing, according to one embodiment, is for IPv4 and IPv6 subnets, where the prefixes needed are specified by the provider 130. However, in some embodiments a default prefix is generated by the connectivity platform. The on-link routes assist the protocol module to look-up and consider the assigned IP interface as a candidate interface during data communication between the computing device 100 and the remote computing device 140.

At step 330 the connectivity platform 330 sets the provider instance 220 to a dormant state. However, in some embodiments the provider instance is assumed to be dormant. By a dormant state it is meant that the provider instance 220 is not active and is not sending or receiving data through the connectivity provider 120. However, this does not necessarily mean that the provider instance 220 is actually dormant.

At step 340 the connectivity platform 120 is used in communicating between the two applications through the network. The process performed by the connectivity platform 120 at this step is described in greater detail in FIG. 4.

Figure 4:
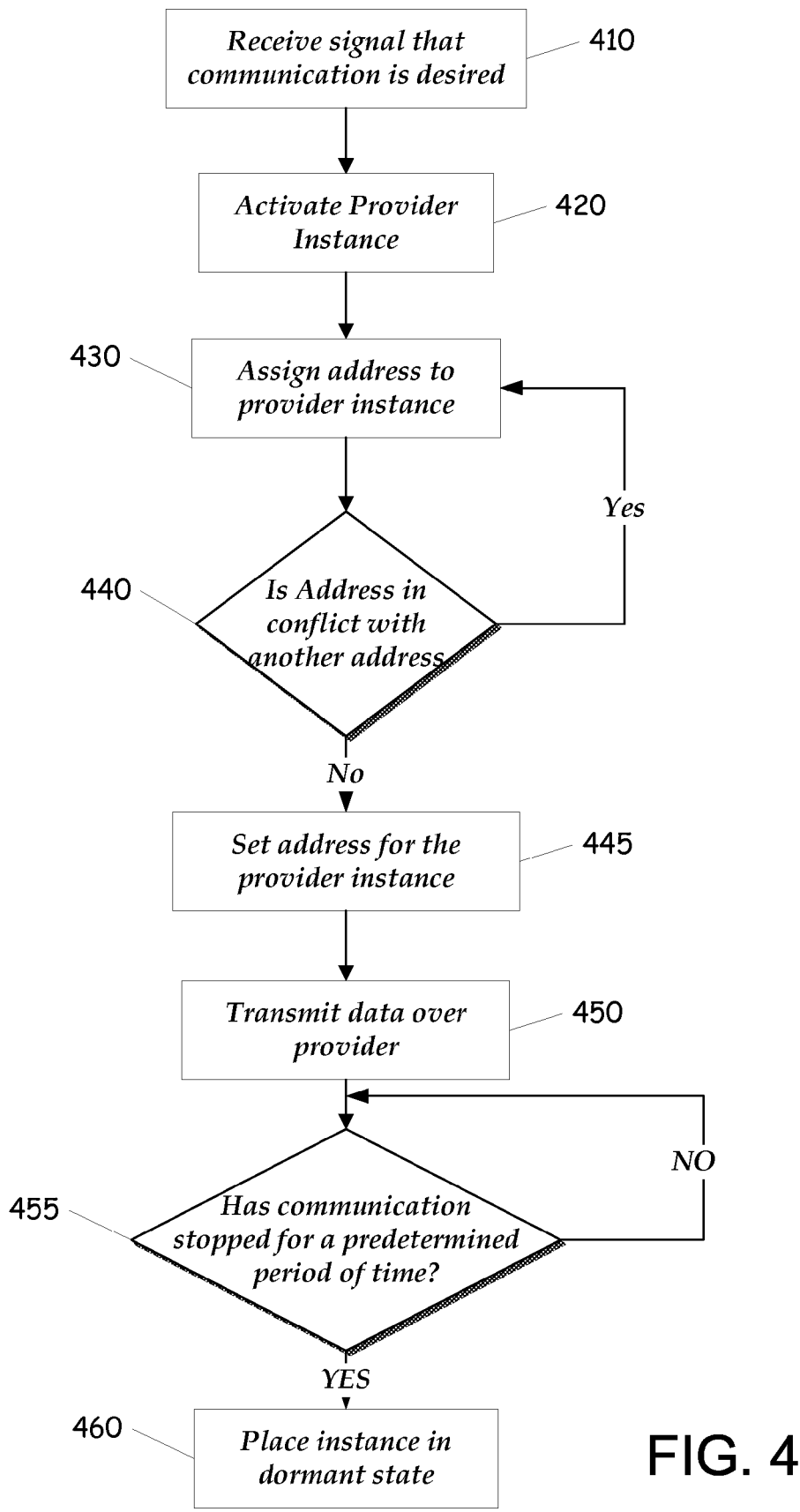
FIG. 4 is a flow diagram illustrating a process for using the connectivity platform according to one embodiment.

FIG. 4 is a flow diagram illustrating a process used by the connectivity platform 120 to process communications according to one illustrative embodiment. At step 410 the connectivity platform 120 receives a signal indicating that communications are desired. In one embodiment this signal can be generated by the opening of a listening endpoint by application 110 that is allowed by the firewall or other policy implementing mechanism to receive edge traversal traffic. In another embodiment the signal is generated by the application 110 for sending outgoing traffic over an interface associated with a provider interface. In yet another embodiment the signal may be a call to a function that brings edge traversal interfaces to a qualified or active state.

Following receipt of the signal the connectivity platform 120 may need to change the state of the provider instance from dormant to active, if the provider instance was not active at the time the signal was received. This is illustrated at step 420. In activating the provider instance the liaison module 260 makes a call to the provider instance 220. This call to the provider instance 220 activates the instance and data can be sent. As discussed above in one embodiment this call is can be a RPC call.

Once the provider instance 220 is active the connectivity platform 120 then proceeds to assign an address for the provider instance. This is illustrated at step 430. In one embodiment the address is automatically configured. In one embodiment this random address is generated using the management module 280 to generate a random address. In other embodiments the address is obtained from other sources.

Once the random address has been assigned, the connectivity platform 120 requests that the provider 130 perform address conflict detection. The conflicting addresses may be identified by reviewing the addresses associated with the provider 130 across all of the computing devices that reachable through network 150. This is illustrated at step 440. The address conflict detection is requested to ensure that when the data is transmitted to the desired application or user that it is sent to the correct application or user. If two users or applications have provider instances that have the same address then it is not possible to route the data to the correct location. If the provider determines that there is no conflicting address assigned a signal is provided to the connectivity platform 120 assigns the selected address to the interface associated with the provider instance 220. This is illustrated at step 445.

If the provider 130 determines that the selected address is in conflict with another address, the provider sends a signal to the connectivity platform indicating that the address is in conflict. This signal causes the connectivity platform 120 to return to step 430 and repeat this process until an address is generated that does not conflict with another address. In some embodiments, a component or system could track all addresses and centrally manage the addresses to avoid conflicts.

Once the address is assigned to the provider instance 220 the data is transmitted to and from the application 110. This is illustrated at step 450. In some embodiments this communication could be simplex. The data is transmitted according to the procedures associated with the provider 130. The provider 130 performs the actual traversal of the NAT 135. During this data transfer the data may be encapsulated both by the liaison module 260 and by the provider instance 220.

Following the completion of the data transmission between the applications 110 and 160 the connectivity platform 120 proceeds to wait a predetermined period of time. This is illustrated at step 455. In one embodiment if the there has been no additional data transfers either inbound or outbound over that period of time, the connectivity platform places the provider instance 220 in to a dormant state. This is illustrated at step 460. If data continues to transfer, the connectivity platform 120 keeps the provider instance 220 open until such time as it has been inactive for the predetermined period of time. In another embodiment the provider instance may remain active if a component that is awaiting a message from another provider is still open the provider instance 220 will remain active, even though data is not being transferred.

Referring back to FIG. 3 at step 350 a provider may deregister from the connectivity platform 120. When a provider 130 deregisters from the connectivity platform the connectivity platform 120 removes any addresses and routes that were configured during the registration process. Further, the provider interface 220 can be removed if for example the provider 130 requests this removal during the deregistration process.

Figure 5:
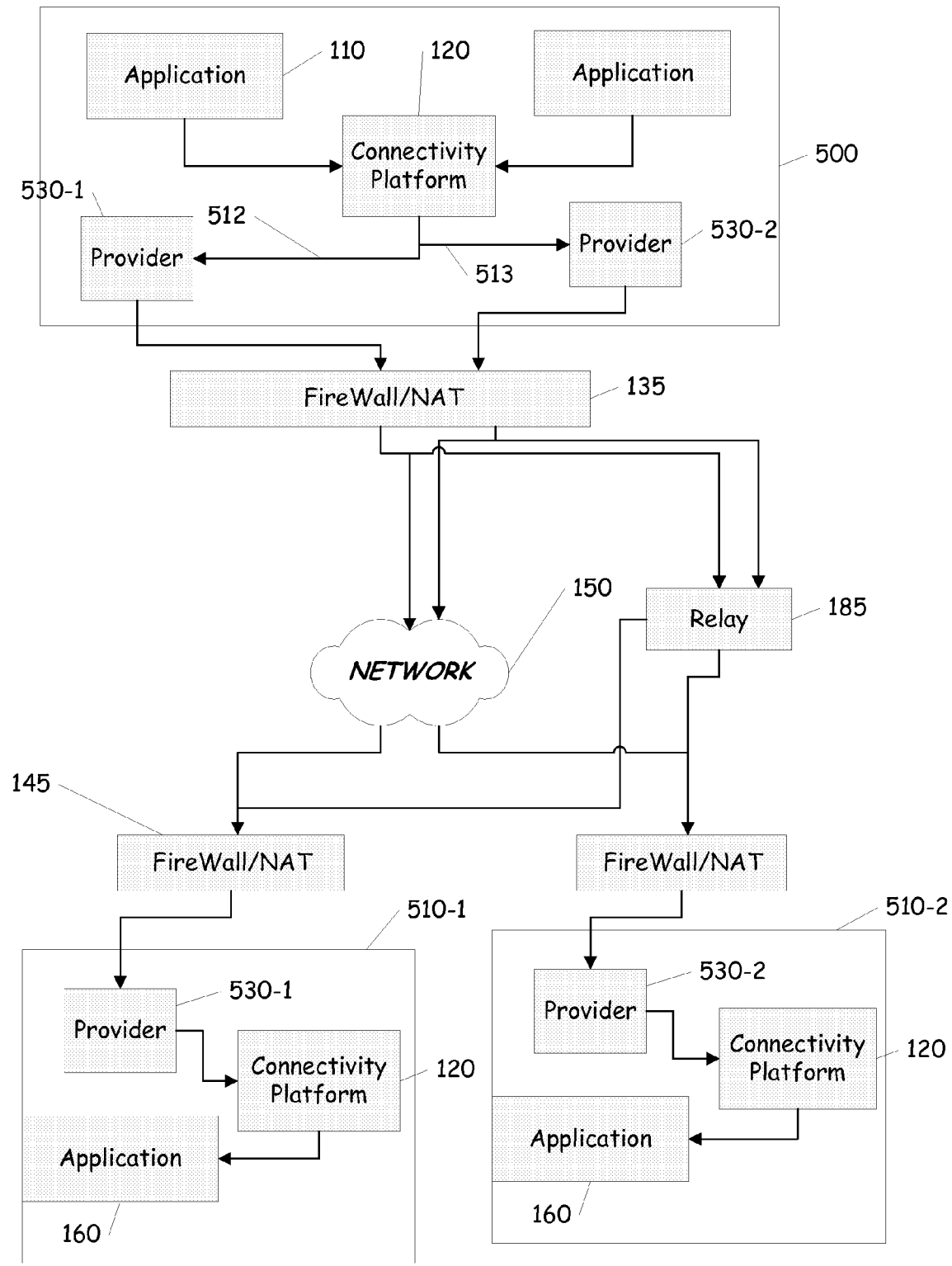
FIG. 5 is a block diagram of the connectivity system according to an alternative embodiment.
Figure 6:
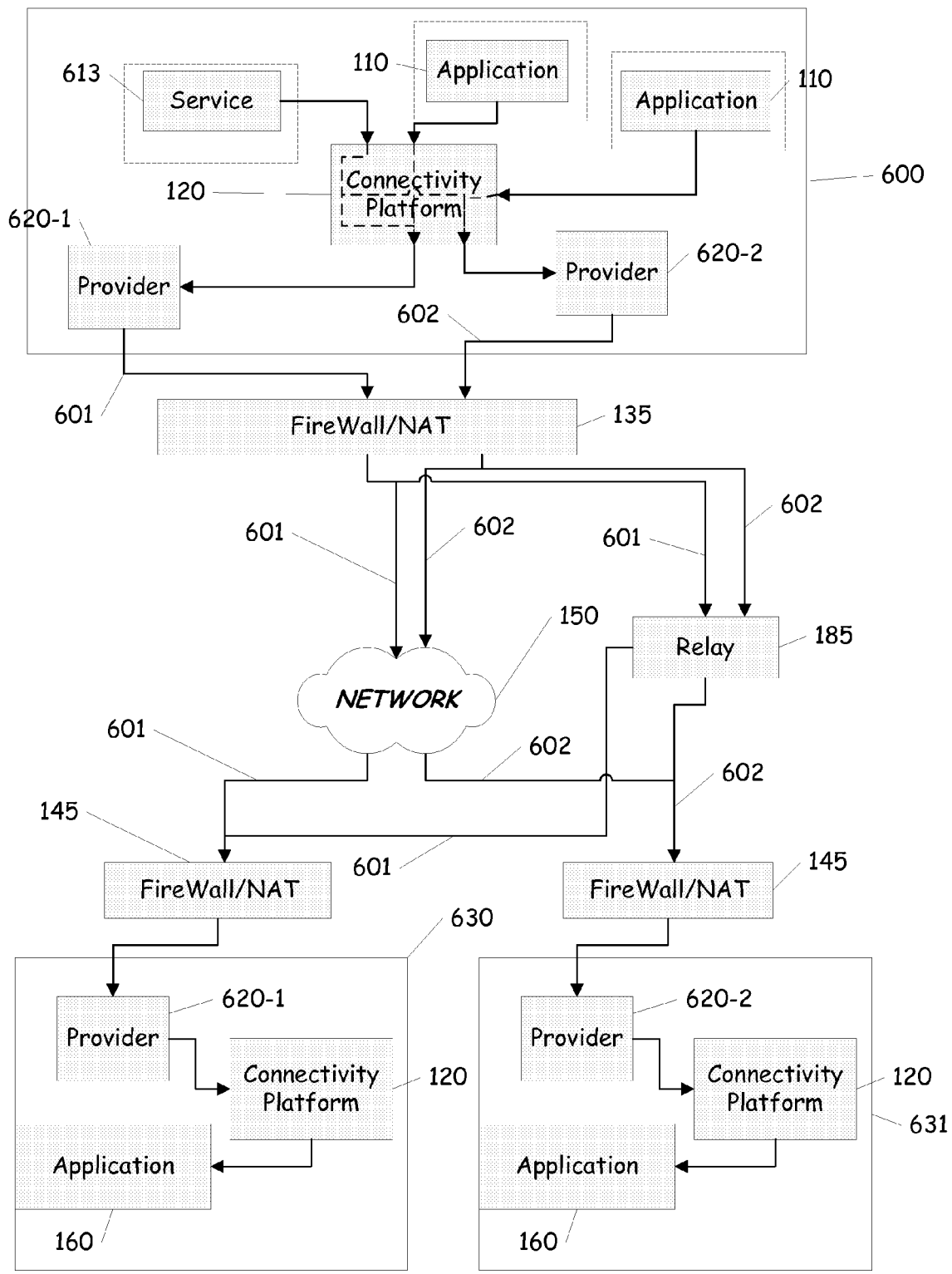
FIG. 6 is a block diagram of the connectivity system according to another alternative embodiment.

While the above discussion has focused on examples where the connectivity platform 120 interacts with a single provider 130, FIGS. 5 and 6 illustrate exemplary alternative embodiments for implementing the connectivity platform 120. Reference numbers that are repeated refer to the same or similar components.

FIG. 5 is a block diagram illustrating a single user of a computing device 500 using multiple providers 530-1, 530-2 to connect to computing devices 510-1, 510-2 that have instances of the same provider 530-1, 530-2 installed. As illustrated in FIG. 5 there are two virtual links 512 and 513. Each link 512, 513 is associated with one of the providers 530-1, 530-2. Computing device 500 is multi-homed to both links. On computing device 500, the connectivity platform 120 assigns different addresses to the interfaces corresponding to the provider instances of providers 530-1, 530-2. To connect to either computing device 510-1 or computing device 510-2, the provider instance selection is performed using each provider instance's ability to detect whether a remote address is reachable via that provider instance as discussed above. Once the correct provider 530-1, 530-2 is selected the use of the instance is the same as discussed above with respect to FIGS. 3 and 4.

FIG. 6 is a block diagram illustrating a multiple user and multiple computing device setup according to one illustrative embodiment. As illustrated in FIG. 6 computing device 600 has two users, 610 and 611 respectively. In one embodiment, each user 610, 611 uses a different provider instance, provider instances 620-1 and 620-2 to communicate with applications 160 on computing devices 630 and 631 respectively. Additionally, the local system 612 of computing device 600 can access the connectivity provider 120 to provide service 613. In the embodiment service 613 has access to both providers 620-1 and 620-2. In FIG. 6 there are two virtual links 601 and 602 (one per provider instance), and computing device 600 is multi-homed to both links.

The provider instances 620-1, 620-2 determine the access policy controlling the user's 610, 611 access to the provider instances as has been discussed above. For example, the policy may allow the system service 613 implementing the resource sharing functionality to access the provider instances so that: the user of computing device 630 can connect to resources shared by user 610 on computing device 600, and the user of computing device 631 can connect to resources shared by user 611 on computing device 600. Once the connection is established the system of FIG. 6 operates similar to the systems discussed above.

Figure 7:
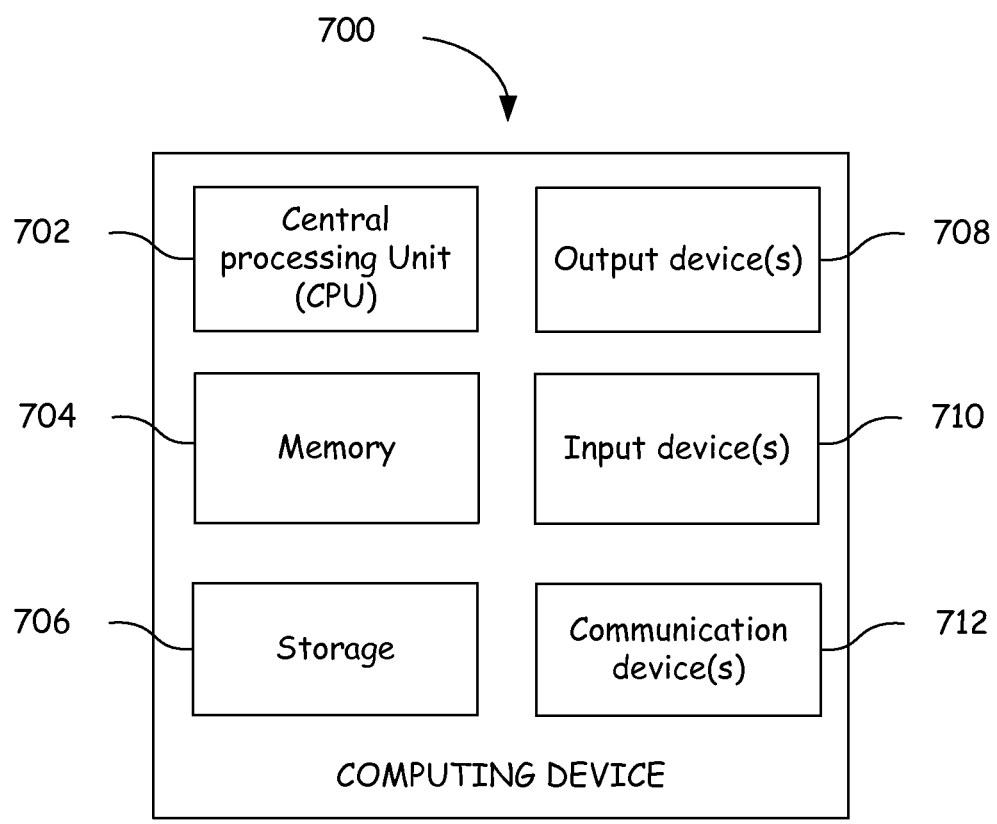
FIG. 7 is a block diagram illustrating components of a computing device according to one embodiment.

FIG. 7 illustrates a component diagram of a computing device according to one embodiment. Computing device 700 is similar to computing devices discussed above with respect to FIGS. 1-6. The computing device 700 can be utilized to implement one or more computing devices, computer processes, or software modules described herein. In one example, the computing device 700 can be utilized to process calculations, execute instructions, receive and transmit digital signals. In another example, the computing device 700 can be utilized to process calculations, execute instructions, receive and transmit digital signals, receive and transmit search queries, and hypertext, compile computer code, as required by the application 110 or application 160.

The computing device 700 can be any general or special purpose computer now known or to become known capable of performing the steps and/or performing the functions described herein, either in software, hardware, firmware, or a combination thereof.

In its most basic configuration, computing device 700 typically includes at least one central processing unit (CPU) 702 and memory 704. Depending on the exact configuration and type of computing device, memory 704 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by both multiple CPU's in parallel.

Computing device 700 may also include additional storage (removable and/or non-removable) including, but not limited to, magnetic or optical disks or tape. Such additional storage is illustrated in FIG. 7 by storage 706. Computer storage media includes volatile and nonvolatile, removable and non-removable media implemented in any method or technology for storage of information such as computer readable instructions, data structures, program modules or other data. Memory 704 and storage 706 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 712 that allow the device to communicate with other devices. Communications device(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 700 may also have input device(s) 77 such as keyboard, mouse, pen, voice input device, touch input device, etc. Output device(s) 708 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of communicating between applications over a network, comprising:
    receiving an indication from a first application indicating that communication of data is desired;
    identifying a provider from the indication from which to communicate the data from the first application to a second application, the provider configured to:
        provide for a traversal of at least one of a Network Address Translator (NAT) or a firewall; and
        responsive to determining a failure associated with the traversal, provide for a data relay;
    assigning an address for a provider instance associated with the provider; and
    sending data from the first application to the second application through the provider based on the assigned address for the provider instance.

2. The method of claim 1, comprising:
    activating the provider instance in response to the received indication.

3. The method of claim 1, assigning the address comprising:
    randomly assigning the address to the provider instance; and
    determining if the assigned address is in conflict with another address associated with the provider.

4. The method of claim 3, determining comprising:
    identifying addresses associated with other provider instances connected to the network; and
    if at least one address is determined to be in conflict, assigning another address to the provider instance.

5. The method of claim 1, comprising:
    receiving data that has traversed at least one firewall disposed between the first application and the second application using protocols associated with the provider.

6. The method of claim 1, comprising:
    selecting the provider instance from a plurality of provider instances associated with the provider.

7. The method of claim 1, identifying a provider comprising:
    selecting the provider from a plurality of providers.

8. A connectivity system configured to provide network connectivity implemented at least in part on a central processing unit (CPU), comprising:
    a first application configured to interact with a second application separated from the first application by a firewall;
    a connectivity platform configured to facilitate data being sent from the first application to the second application through the firewall; and
    at least one provider connected to the connectivity platform, the provider configured to at least one of traverse the firewall to provide data from the first application to the second application or responsive to determining a failure associated with the traversing, provide for a data relay.

9. The connectivity system of claim 8, the connectivity platform comprising:
    a provider instance configured to interface with the at least one provider;
    a protocol module configured to at least one of send data to or receive data from the provider instance; and
    a liaison module configured to encapsulate data prior to the data being sent to the provider instance.

10. The connectivity system of claim 9, the connectivity platform comprising:
    a management module configured to change a state of the provider instance.

11. The connectivity system of claim 9, the provider instance comprising at least one of a plurality of provider instances.

12. The connectivity system of claim 11, respective provider instances of the plurality associated with a different provider.

13. The connectivity system of claim 11, at least two or more of the plurality of provider instances associated with a same provider.

14. The connectivity system of claim 9, the protocol module configured to implement a filtering platform based upon at least one of a network filtering application or an inspection application.

15. A computer readable device having computer executable instructions that when executed cause a computer to:
    receive an indication from a first application at a connectivity platform that communications are desired;
    identify a provider at the connectivity platform based on the indication, the provider configured to:
        provide for a traversal of at least one of a Network Address Translator (NAT) or a firewall; and
        responsive to determining a failure associated with the traversal, provide for a data relay; and
    send data from the first application to a second application.

16. The computer readable device of claim 15, comprising instructions to:
    encapsulate the data prior to the data being sent to the second application.

17. The computer readable device of claim 15, comprising instructions to:
    encapsulate the data in a format required by the provider.

18. The computer readable device of claim 15, comprising instructions to:
    assign an address to a provider instance of the provider by randomly generating the address.

19. The computer readable device of claim 18, comprising instructions to:
    determine if the assigned address is in conflict with another address associated with the provider; and
    if the address is determined to be in conflict, assign a different address to the provider instance.

20. The computer readable device of claim 15, comprising instructions to:
    receive a registration request from a second provider not associated with the connectivity platform;
    generate a new provider instance for the second provider not associated with the connectivity platform; and
    assign an initial address to the new provider instance.

* * * * *